(12) United States Patent
Barrau

(10) Patent No.: US 11,860,285 B2
(45) Date of Patent: *Jan. 2, 2024

(54) METHOD AND DEVICE FOR ASSISTING WITH THE NAVIGATION OF A FLEET OF VEHICLES USING AN INVARIANT KALMAN FILTER

(71) Applicant: SAFRAN, Paris (FR)

(72) Inventor: Axel Barrau, Moissy-Cramayel (FR)

(73) Assignee: SAFRAN, Paris (FR)

( * ) Notice: Subject to any disclaimer, the term of this patent is extended or adjusted under 35 U.S.C. 154(b) by 462 days.

This patent is subject to a terminal disclaimer.

(21) Appl. No.: 17/262,392

(22) PCT Filed: Jul. 23, 2019

(86) PCT No.: PCT/FR2019/051827
§ 371 (c)(1),
(2) Date: Jan. 22, 2021

(87) PCT Pub. No.: WO2020/021195
PCT Pub. Date: Jan. 30, 2020

(65) Prior Publication Data
US 2021/0293978 A1 Sep. 23, 2021

(30) Foreign Application Priority Data
Jul. 23, 2018 (FR) ...................................... 1856803

(51) Int. Cl.
*G01S 19/39* (2010.01)
*G01S 19/48* (2010.01)
(Continued)

(52) U.S. Cl.
CPC ........ *G01S 19/393* (2019.08); *G01C 21/1652* (2020.08); *G01S 19/38* (2013.01);
(Continued)

(58) Field of Classification Search
CPC ...... G01S 19/393; G01S 19/38; G01S 19/428; G01S 19/43; G01S 19/485; G01S 19/51;
(Continued)

(56) References Cited

PUBLICATIONS

J. Goppert, S. Yantek and I. Hwang, "Invariant Kalman filter application to optical flow based visual odometry for UAVs," 2017 Ninth International Conference on Ubiquitous and Future Networks (ICUFN), Milan, Italy, 2017, pp. 99-104, doi: 10.1109/ICUFN.2017.7993755. (Year: 2017).*

(Continued)

*Primary Examiner* — Geepy Pe
*Assistant Examiner* — Kimia Kohankhaki
(74) *Attorney, Agent, or Firm* — Sughrue Mion, PLLC

(57) ABSTRACT

A method for assisting the navigation of a fleet of vehicles including main vehicle and a secondary vehicle movable relative to the main vehicle includes receiving data acquired by one or more sensors, the received data including relative kinematic data between the main vehicle and the secondary vehicle, and estimating a navigation state of the fleet of vehicles by an invariant Kalman filter using the received data as observations. The navigation state includes first variables representative of a first rigid transformation linking a frame attached to the main vehicle to a reference frame, and second variables representative of a second rigid transformation linking the frame attached to the main vehicle to a frame attached to the secondary vehicle. The invariant Kalman filter uses as binary operation an operation including a term-by-term composition of the first rigid transformation and of the second rigid transformation.

20 Claims, 2 Drawing Sheets

(51) Int. Cl.
  *G01C 21/16* (2006.01)
  *G01S 19/43* (2010.01)
  *G01S 19/51* (2010.01)
  *G01S 19/54* (2010.01)
  *G01S 19/38* (2010.01)
  *G01S 19/42* (2010.01)
  *G05D 1/02* (2020.01)
  *G06F 7/42* (2006.01)
  *G06F 7/40* (2006.01)

(52) U.S. Cl.
  CPC ............ *G01S 19/428* (2013.01); *G01S 19/43* (2013.01); *G01S 19/485* (2020.05); *G01S 19/51* (2013.01); *G01S 19/54* (2013.01); *G05D 1/0291* (2013.01); *G06F 7/405* (2013.01); *G06F 7/42* (2013.01)

(58) Field of Classification Search
  CPC . G01S 19/54; G06F 7/405; G06F 7/42; G01C 21/1652; G05D 1/0291
  See application file for complete search history.

(56) References Cited

PUBLICATIONS

Mahmoud et al., " Distributed Kalman filtering: a bibliographic review", IET Control Theory Applications, The institution of Engineering and Technology 2013, Mar. 2013, vol. 7. Issue 4, pp. 483-501, XP006045415 (19 pages total).
Zou et al., "CoSLAM: Collaborative Visual SLAM in Dynamic Environments", IEEE Transactions on Pattern Analysis and Machine Intelligence, vol. 35, No. 2, Feb. 2013, pp. 354-366, XP011490796 (13 pages total).
Kia et al., "Cooperative Localization for Mobile Agents, A recursive decentralized algorithm based on Kalman filter decoupling", May 21, 2015, XP055595143 (47 pages total).
International Search Report dated Oct. 23, 2019 from the International Searching Authority in International Application No. PCT/FR2019/051827.
Written Opinion dated Oct. 23, 2019 from the International Searching Authority in International Application No. PCT/FR2019/051827.

* cited by examiner

METHOD AND DEVICE FOR ASSISTING WITH THE NAVIGATION OF A FLEET OF VEHICLES USING AN INVARIANT KALMAN FILTER

CROSS REFERENCE TO RELATED APPLICATIONS

This application is a National Stage of International Application No. PCT/FR2019/051827 filed Jul. 23, 2019, claiming priority based on French Patent Application No. 1856803 filed Jul. 23, 2018, the entire contents of each of which are herein incorporated by reference in their entireties.

FIELD OF THE INVENTION

The present invention concerns a method for assisting the navigation of a fleet of vehicles and a device adapted to implement such a method.

STATE OF THE ART

The problem of estimating the state of a physical system generally arises as follows. The state of the system at an instant n is represented by a vector $X_n$, and an observation available at the instant n is represented by another vector $Y_n$. The evolution of the system is written:

$$X_{n+1} = f(X)$$

where $f$ is a known function (generally called propagation function). The observations $Y_n$ are related to the state of the system by a known observation function h:

$$Y_n = h(X_n)$$

Building a good estimation $\hat{X}_n$ of the state $X_n$ from the sequence $(Y_n)_{n \geq 0}$ is generally a difficult problem, which can nevertheless be simplified in some cases.

"Linear systems" refer to the particular case of the systems with the form:

$$X_{n+1} = FX_n + w_n$$

$$Y_n = HX_n + V_n$$

where F is a propagation matrix, H is an observation matrix, $w_n$ and $V_n$ are noises that disturb the predictions and the measurements.

In this linear case, a known method consists in building an estimator referred to as "Kalman filter". This Kalman filter implements the following calculations:

$$\hat{X}_{n+1|n} = F\hat{X}_{n|n}$$

$$\hat{X}_{n+1|n+1} = \hat{X}_{n+1|n} + K_{n+1}(Y_{n+1} - H\hat{X}_{n+1|n})$$

where the indices n+1|n and n+1|n+1 respectively designate the estimation calculated at the instant n+1 without taking into account the observation $Y_{n+1}$ and at the instant n+1 by taking into account the observation $Y_{n+1}$. The matrix $K_n$ is called "gain matrix", it can be calculated using a Riccati equation. The estimation error is then defined as:

$e_{n|n} = X_n - \hat{X}_{n|n}$ (after taking into account the observation $Y_n$)

$e_{n+1|n} = X_{n+1} - \hat{X}_{n+1|n}$ (before taking into account the observation $Y_{n+1}$)

It is possible to easily verify that this error follows the following evolution:

$e_{n+1|n} = Fe_{n|n}$ (before taking into account the observation $Y_{n+1}$)

$e_{n+1|n+1} = (I - K_{n+1}H)e_{n+1|n}$ (after taking into account the observation $Y_{n+1}$)

where I designates the identity matrix.

The equations above do not depend on $X_n$, it is therefore possible to build an estimator that works for any actual trajectory of the system, which is not the case for any non-linear system.

In the case of a non-linear system, an ordinary Kalman filter cannot be implemented. Thus, there has been proposed a variant of the Kalman filter called "extended" Kalman filter, which is adapted to a non-linear system. However, when an extended Kalman filter is used, the simplifications observed in the linear case no longer occur, so that an error equation involving $X_n$ and $\hat{X}_n$ is obtained. This problem is at the origin of most of the divergence cases encountered when using an extended Kalman filter.

Nevertheless, a second particular case making the estimation problem easier is the case of the "affine group" observation systems, that is to say the systems for which there is a group operation (i.e. an binary operation which will be noted in the following by a star *) defined on the space of the state considered and such that the two following properties are verified:

a. The propagation function $f$ verifies for any pair a, b of elements of the state space the relation:

$$f(a*b) = f(a)*f(Id)^{-1}*f(b)$$

where Id is the identity element of the group induced by the operation *.

b. The observation function h has the form $h(X) = l(x, y_0)$, with $y_0$ an element of the space of the observations (to which the $Y_n$ belongs) and $l(.,.)$ a group action, i.e. a function verifying $$l(a*b, y) = l(a, l(b, y))$$

Under these two conditions, it is possible to define an extended Kalman filter called "invariant" (generally more simply called "invariant Kalman filter") which is governed by the following equations:

$$\hat{X}_{n+1|n} = f(\hat{X}_{n|n})$$

$$\hat{X}_{n+1|n+1} = \hat{X}_{n+1|n} * \exp(K_n[l(\hat{X}_{n+1|n}^{-1}, Y_{n+1}) - l(Id, y_0)])$$

where $\exp(\cdot)$ is the exponential map (this function is known whenever the group operation is known, if it defines a Lie group) and $K_n$ is a "gain matrix" as in the linear case. It is then possible to show that the estimation error will also have an autonomous evolution, as in the linear case. The problem of estimating the state is therefore simplified, even if the system considered is not linear.

When condition b. is not verified, it is possible to use a filter with the form $$X_{n+1|n} = f(\hat{X}_{n|n})$$

$$\hat{X}_{n+1|n+1} = \hat{X}_{n+1|n} * \exp(K_{n+1}[Y_{n+1} - h(\hat{X}_{n+1|n})])$$

Invariant Kalman filters have thus been used in the carrier navigation assistance. An invariant Kalman filter used in such navigation assistance context estimates a navigation state representative of a movement of the considered carrier.

As explained previously, the use of an invariant Kalman filter requires finding an operation (or binary operation *) for which the conditions a. and b. are verified in order to make the estimation problem easier. There is no generic method for finding such an operation, and various publications have been aimed to provide the correct operation for specific systems. As examples:

The operation to be used for an attitude and velocity estimation problem is described in the following document: Bonnabel, S., Martin, P., & Salaün, E. (2009, December). Invariant Extended Kalman Filter: theory and application to a velocity-aided attitude estimation problem. In Decision and Control, 2009 held jointly with the 200928th Chinese Control Conference. CDC/CCC 2009. Proceedings of the 48th IEEE Conference on (pp. 1297-1304). IEEE.

The operation to be used for an inertial navigation with estimation of the attitude, velocity and position is described in the following document: Barrau, A., & Bonnabel, S. (2017). The invariant extended Kalman filter as a stable observer. IEEE Transactions on Automatic Control, 62(4), 1797-1812.

The operation to be used for the SLAM (Simultaneous Localization And Mapping), That is to say, a navigation using fixed reference points from the vehicle's environment, is described in Barrau, A., & Bonnabel, S. (2015). An EKF-SLAM algorithm with consistency properties. arXiv preprint arXiv:1510.06263.

A list of practical systems for which an operation is known is further described in Barrau, A., & Bonnabel, S. (2017). Linear observation systems on groups (1).

In each of these applications, an invariant Kalman filter is used to estimate the navigation state of a single carrier.

Document Zou, D., & Tan, P. (2013). Coslam: Collaborative visual slam in dynamic environments. IEEE transactions on pattern analysis and machine intelligence, 35(2), 354-366 pursues another objective: that of providing assistance in the navigation not of a single carrier, but of a fleet of vehicles comprising a main vehicle and at least one secondary vehicle movable relative to the main vehicle.

In each of these applications, the Kalman filter uses proprioceptive data from the vehicle supplemented by measurements relating to environmental objects considered to be fixed (known or unknown visual reference points, terrestrial magnetic field, Earth itself, etc.). The coordinates of these objects may or may not be known in the reference frame, but in all cases, they do not vary over time. However, this assumption no longer holds if the carrier is surrounded by other potentially moving vehicles.

DISCLOSURE OF THE INVENTION

An aim of the invention is to provide assistance in the navigation of a fleet of several vehicles easy to implement.

There is therefore proposed, according to a first aspect of the invention, a method for assisting the navigation of a fleet of vehicles comprising a main vehicle and a secondary vehicle movable relative to the main vehicle, the method comprising steps of:
receiving data acquired by at least one sensor, the data received comprising relative kinematic data between the main vehicle and the secondary vehicle,
estimating a navigation state of the fleet of vehicles by an invariant Kalman filter using the received data as observations, in which the navigation state comprises:
first variables representative of a first rigid transformation linking a frame attached to the main vehicle to a reference frame, and
second variables representative of a second rigid transformation linking a frame attached to the main vehicle to a frame attached to the secondary vehicle,
and in which the invariant Kalman filter uses as binary operation an operation comprising a term-by-term composition of the first rigid transformation and of the second rigid transformation.

The proposed method according to the first aspect of the invention advantageously exploits the fact that the carriers surrounding the main carrier also have movement sensors and that they transmit their measurements to the main carrier. These measurements will allow the main carrier to use the carriers that surround them as reference points although they are movable.

It also turns out that the binary operation used in this method allows approximating the conditions a. and b. set out in the introduction. The calculations implemented by the invariant Kalman filter are therefore particularly simple to implement.

The method according to the first aspect of the invention may further comprise the following features, taken alone or in combination when technically possible.

Preferably, the navigation state of the fleet further comprises at least one error state specific to the sensor, and in which the binary operation is additive for this error variable specific to the sensor.

Preferably, the method comprises receiving proprioceptive movement data from the main vehicle and the secondary vehicle, wherein the estimation comprises phases of:
propagating a navigation state of the fleet previously estimated by the invariant Kalman filter using the proprioceptive movement data from the main vehicle and the secondary vehicle to obtain a propagated state,
updating the propagated state using observations, to obtain a new navigation state of the fleet.

Preferably, the proprioceptive movement data are acquired by respective proprioceptive sensors of the main vehicle and of the secondary vehicle, and the navigation state of the fleet further comprises at least one error state specific to at least one of the proprioceptive sensors for which the binary operation is additive.

Preferably:
the first variables comprise a rotation matrix representing an attitude of the main vehicle and a position vector of the main vehicle, and
wherein the second variables comprise a rotation matrix representing the attitude of the main vehicle relative to the secondary vehicle and a position vector of the main vehicle relative to the secondary vehicle.

Preferably:
the navigation state of the fleet further comprises a velocity vector $v_p$ of the main vehicle in the reference frame, and a velocity vector equal to $R_S^T(v_p-v_S)$, where $v_S$ is a velocity of the secondary vehicle in the reference frame, and $R_S$ is a rotation matrix representing the attitude of the main vehicle relative to the secondary vehicle,
the binary operation applies transformations identical to one of the position vectors and one of the velocity vectors.

The estimation can be implemented by the main vehicle, and the received data can comprise position data from the secondary vehicle in a frame attached to the main vehicle acquired by at least a first sensor of the main vehicle comprising for example a lidar, a camera or an odometer. As a variant, the estimation can be implemented by the main vehicle, and the received data can comprise position data from the main vehicle in a frame attached to the secondary vehicle acquired by at least a second sensor of the secondary vehicle comprising for example a lidar, a camera or an odometer.

The received data can comprise relative kinematic data between the main vehicle and a third object separate from the main vehicle and the secondary vehicle, the relative kinematic data between the main vehicle and the third object also being used as observations by the invariant Kalman filter. The third object is, for example, a daymark.

The relative kinematic data between the main vehicle and a third object may comprise data acquired by a GPS/GNSS receiver of the main vehicle.

Preferably, the method comprises steps of:
implementing the estimation step based on the position data from the secondary object in the frame attached to the main vehicle so as to generate a first estimation of the navigation state of the fleet,
implementing the estimation step based on the position data from the main vehicle in a frame attached to the secondary object, so as to generate a second estimation of the navigation state of the fleet,
merging the first and second estimations of the navigation state of the fleet, so as to produce a third estimation of the navigation state of the fleet, the merging comprising for example the calculation of an average of the first and second estimations of the navigation state of the set of objects.

In order to make the evolution of the error independent from the state of the system, the following is preferably provided:
the received data used as observations are written as a vector $Y_1$ with the form $Y_1 = l(X_1, y_0)$, where $l(.,.)$ is a left group action for the binary operation, $X_1$ is the navigation state of the fleet, and $y_0$ is a vector of the same dimension as $Y_1$, and in which the invariant Kalman filter uses an innovation $Z = l(\hat{X}_1^+, Y_1)$, or in which
the received data used as observations are written as a vector $Y_2$ with the form $Y_2 = l(X_2^{-1}, y_0)$ where $l(.,.)$ is a left group action for the binary operation, $X_2$ is the navigation state of the fleet, and $y_0$ is a vector of the same dimension as $Y_2$, and in which the invariant Kalman filter uses an innovation $Z = l(\hat{X}_2, Y_2)$.

there is also proposed according to a second aspect of the invention a device for assisting the navigation of a fleet of vehicles comprising a main vehicle and a secondary vehicle movable relative to the main vehicle, the device comprising:
a receiving interface to receive data acquired by at least one sensor, the data comprising relative kinematic data between the main vehicle and the secondary vehicle,
a processing unit configured to implement an invariant Kalman filter so as to estimate a navigation state of the fleet of vehicles, in which the invariant Kalman filter is configured to use the received data as observations, in which the navigation state comprises first variables representative of a first rigid transformation linking a frame attached to the main vehicle to a reference frame and second variables representative of a second rigid transformation linking a frame attached to the secondary vehicle to a frame attached to the main vehicle, and in which the invariant Kalman filter is configured to use as binary operation a term-by-term composition of the first rigid transformation and of the second rigid transformation.

DESCRIPTION OF THE FIGURES

Other characteristics, aims and advantages of the invention will emerge from the following description, which is purely illustrative and not restrictive, and which should be read in relation to the appended drawings in which.

In all the figures, similar elements bear identical reference numerals.

DETAILED DESCRIPTION OF THE INVENTION

1/ Fleet of Vehicles

Figure 1:
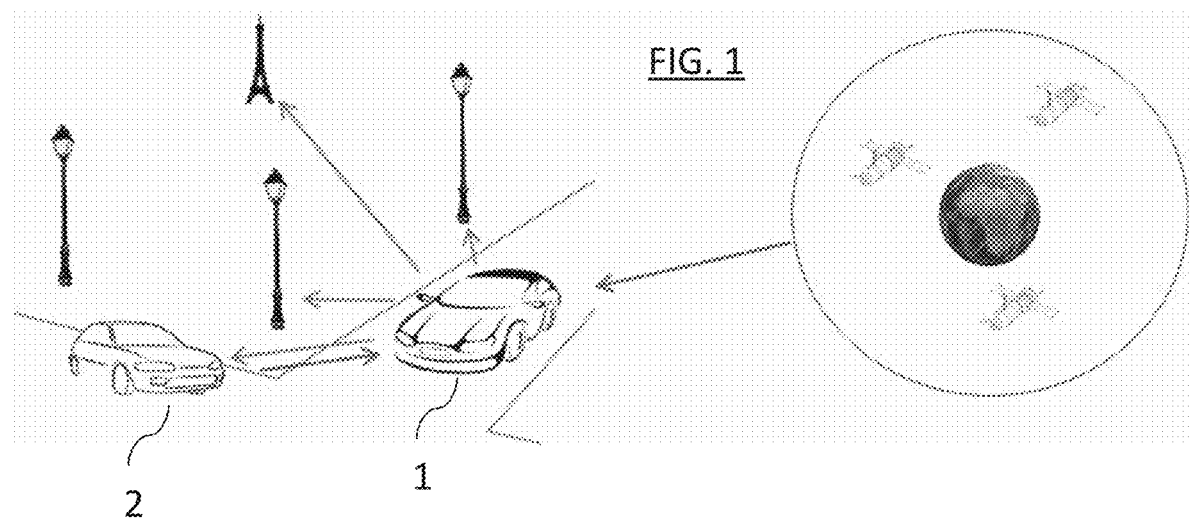
FIG. 1 illustrates different objects movable relative to each other, in particular a fleet of vehicles.

Referring to FIG. 1, a fleet of vehicles comprises a main vehicle 1 and at least one secondary vehicle 2 movable relative to the main vehicle 1. Each vehicle 1, 2 can be of any type: land vehicle, ship, aircraft, etc.

Objects external to the fleet of vehicles are also represented in FIG. 1: daymarks (lampposts and Eiffel tower), as well as the Earth itself. As will be seen below, these objects are reference points for the navigation of the fleet.

In the following, different frames are considered: a main frame attached to the main vehicle 1, a secondary frame attached to the secondary vehicle 2, and a reference frame. The reference frame is for example a celestial frame attached to stars or to the Earth.

Figure 2:
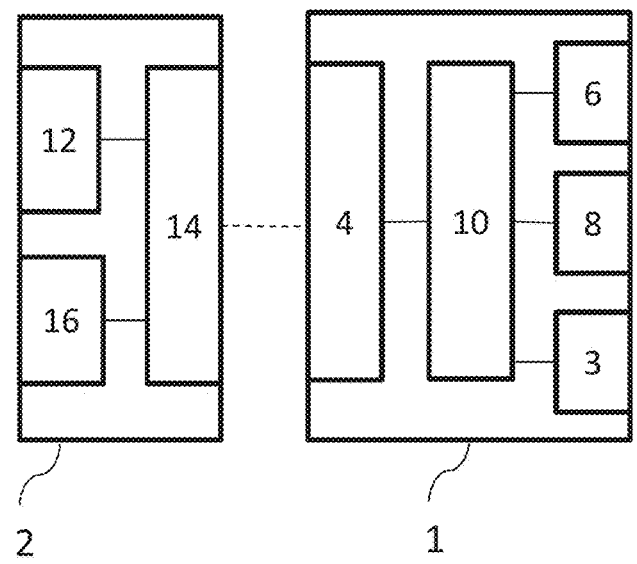
FIG. 2 schematically illustrates the internal components of a main vehicle and of a secondary vehicle of a fleet of vehicles, according to one embodiment of the invention.

Referring to FIG. 2, the main vehicle 1 comprises a data receiving interface.

The receiving interface comprises at least one first sensor 3 onboard the main vehicle 1. The at least one first sensor 3 is configured to acquire kinematic data from the secondary vehicle 2 in the main frame. The at least one first sensor 3 comprises for example a lidar, a camera or an odometer.

In the present disclosure, it is considered that the expression "kinematic data" covers in particular positions, velocities or accelerations.

The receiving interface also comprises a communication interface 4 adapted to communicate with the secondary vehicle 2, in particular receive from the latter kinematic data from the main vehicle 1 in the frame attached to the secondary vehicle 2. The communication interface 4 is of the wireless radio type, and comprises for example an antenna.

The main vehicle 1 furthermore comprises at least one proprioceptive sensor 6.

The proprioceptive sensor 6 comprises for example an inertial unit. The inertial unit comprises a plurality of inertial sensors such as gyrometers and accelerometers. As a variant, the proprioceptive sensor 6 comprises at least one odometer.

The main vehicle 1 further comprises a receiver 8 configured to acquire relative kinematic data between the main vehicle 1 and a third object separate from the main vehicle 1 and from the secondary vehicle 2. The receiver is for example a GPS/GNSS receiver, in which case the third object is the Earth or one of the stars to which the celestial frame is attached. As a variant or in addition, this receiver comprises a lidar, a camera, in which case the third object can be a daymark located in the vicinity of the main vehicle 1. In another variant, the receiver comprises an odometer which has a relative velocity of the carrier relative to the Earth.

The main vehicle 1 furthermore comprises a data processing unit 10. The processing unit 10 is arranged to process data received by the receiving interface (therefore received by the first sensor 3 or received by the communication interface 4), by the inertial unit 6 or by the receiver 8.

The data processing unit 10 typically comprises at least one processor configured to implement a navigation assistance method which will be described below, by means of an invariant-type Kalman filter. The invariant Kalman filter is typically in the form of a computer program executable by the processor of the data processing unit. The general operation of an invariant Kalman filter is known per se. However, it will be seen below that the binary operation used to configure the invariant Kalman filter implemented by processing unit 10 is chosen in a particular manner, so as to adapt to the context of the assistance in the navigation of the fleet of vehicles comprising the vehicles 1 and 2.

Preferably, the processing unit 10 comprises at least two processors, so as to implement two Kalman filters in parallel. It will be seen below that these two Kalman filters do not use exactly the same input data.

Furthermore, the secondary vehicle 2 comprises at least one second sensor 12 and a communication interface 14 for transmitting data acquired by the at least one second sensor 12 to the communication interface 4 of the main vehicle 1.

The second sensor 12 is configured to acquire movement data from the main vehicle 1 in the frame attached to the secondary vehicle 2. The at least one second sensor 12 comprises for example a lidar, a camera or an odometer.

The secondary vehicle 2 comprises means for providing proprioceptive movement data from the secondary vehicle.

These providing means comprise for example at least one proprioceptive sensor 16. The proprioceptive sensor is for example one or more of the types of sensors envisaged for the proprioceptive sensor 6.

As a variant, these providing means comprise a memory storing an a priori model of evolution of the secondary vehicle 2. This memory can also be integrated into the secondary vehicle 2 as well as into the main vehicle 1.

2/ Configuration of the Invariant Kalman Filter

The invariant Kalman filter implemented by the processing unit 10 is configured to estimate a navigation state of the fleet comprising the main vehicle 1 and the secondary vehicle 2.

The navigation state comprises first variables representative of a first rigid transformation linking the main frame (attached to the main vehicle 1) to the reference frame, and second variables representative of a second rigid transformation linking the secondary frame (attached to the secondary vehicle 2) to the main frame.

The first rigid transformation allows for example switching from the frame linked to the main vehicle 1 to the reference frame, and the second one allows switching from the frame linked to the main vehicle 1 to the frame linked to the secondary vehicle 2.

In a well-known manner, a rigid transformation (also known as affine isometry), is a transformation that preserves the distances between pairs of points of a solid. Thus, each of the first and second rigid transformations can be characterized by the composition of a rotation and a translation.

In the following, an embodiment will be detailed in which the navigation state, denoted X, comprises the following elements:

$$X = (R_p, x_p, R_{sp}, x_{sp})$$

where $R_p$, $x_p$, $R_{sp}$, $x_{sp}$ are defined as follows:

$R_p$ and $x_p$ are respectively a rotation matrix and a vector of dimension 3, representing the attitude and the position of the main vehicle: a vector u written in the frame of the main vehicle 1 becomes the vector $R_p u + x_p$ in the fixed frame.

$R_{sp}$ and $x_{sp}$ are respectively a rotation matrix and a dimension vector 3, representing the attitude and the relative position of the main vehicle relative to the secondary vehicle: a vector u written in the frame of the main vehicle 1 becomes the vector $R_{sp} u + x_{sp}$ in the frame of the secondary vehicle.

In this particular embodiment, the first variables are $R_p$, $x_p$ and the second variables are $R_{sp}$, $x_{sp}$.

The expression "the object X' is of the same nature as the state vector", used below, will mean that X' is a succession of matrices and vectors similar to X.

The number 3×(r+v)=12 will also be called "dimension of state X" where r is the number of rotation matrices appearing in X and v the number of vectors appearing in X. In other embodiments, this number can be different.

Furthermore, the invariant Kalman filter is further configured to use as observations relative kinematic data between the main vehicle 1 and the secondary vehicle 2 received by the receiving interface, coming from the first sensor 3 of the main vehicle 1.

The observation here will be the relative position of the secondary vehicle expressed in the frame of the main vehicle:

$$Y = -R_{sp}^T x_{sp}$$

The invariant Kalman filter is configured to use as binary operation an operation comprising a term-by-term composition of the first rigid transformation and of the second rigid transformation.

This binary operation, denoted *, applies the following transformation to two objects $(R_p, x_p, R_{sp}, x_{sp})$ and $(R'_p, x'_p, R'_{sp}, x'_{sp})$ in one embodiment:

$$(R_p, x_p, R_{sp}, x_{sp}) * (R'_p, x'_p, R'_{sp}, x'_{sp}) = (R_p R'_p, x'_p + R_p x'_p, R_{sp} R'_{sp}, x_{sp} + R_{sp} x'_{sp})$$

3/ Method for Assisting the Navigation of the Fleet

Figure 3:
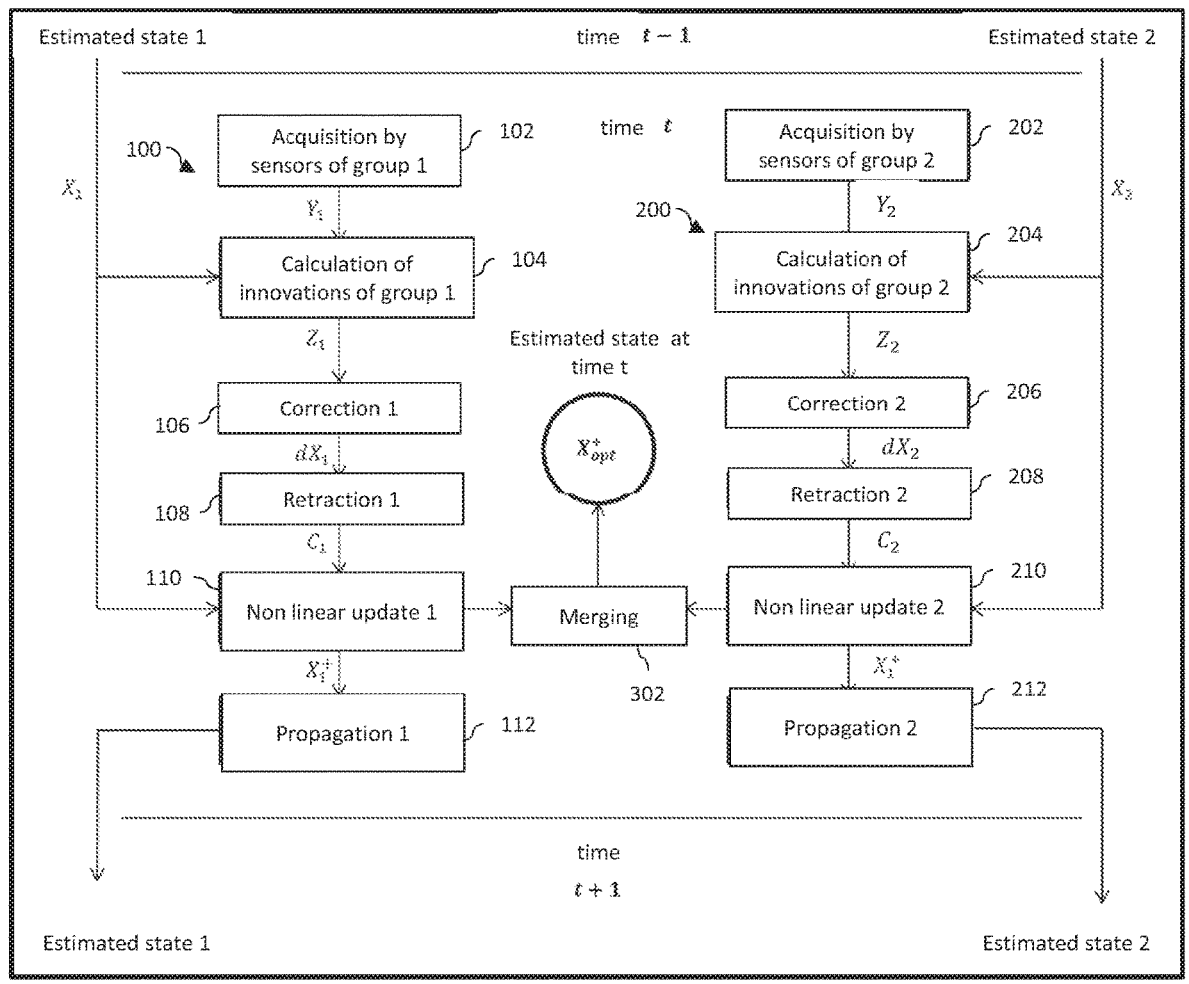
FIG. 3 is a flowchart of steps of a navigation assistance method, according to one embodiment of the invention.

Referring to FIG. 3, a method 100 for assisting the navigation of the fleet according to a first embodiment, and implementing an invariant Kalman filter configured as indicated in section 2/, comprises the following steps.

It is assumed that an estimation $\hat{X}_1$ of the navigation state of the fleet has been estimated by the invariant Kalman filter.

In an acquisition step 102, the first sensor 3 acquires a first group of movement data $Y_1$ from objects external the main vehicle 1 in the main frame. These data can comprise:

position data of the secondary vehicle 2 in the main frame (the corresponding external object is then the secondary vehicle 2)

position data of at least one daymark in the main frame (the corresponding external object is then this daymark). The daymark is at a known position in the reference frame.

These data $Y_1$ are transmitted to the processing unit 10.

In a step 104, the processing unit 10 calculates the difference between the observed measurements $Y_1$ and the expected measurements (this difference, denoted $Z_1$, is called innovation in the literature dealing with Kalman filters). The expected measurements are deduced from the state $X_1$ previously estimated by the invariant Kalman filter.

In a correction step 106, the data processing unit 10 multiplies the innovation $Z_1$ by a matrix $K_1$ called "gain" matrix, which expresses $Z_1$ in a linear correction $dx_1 = K_1 Z_1$ to be applied to the state of the system.

The choice of the gains is a classic question common to most estimation methods (see below).

In a retraction step 108, the processing unit 10 transforms the linear correction $dx_1$ into a non-linear correction $C_1$ of the same nature as $\hat{X}_1$ (the state $\hat{X}_1$ is not a vector because it contains rotations). The transformation used is any function taking as argument a vector of the dimension of the state X (12 in this embodiment) and returning an object of the same nature as X, but a particularly efficient choice is the term-by-term exponential of the Lie group of the pairs of rigid transformations.

A non-linear update step 110 is then implemented by the processing unit 10. In this step 110, the processing unit 10 combines the estimation $X_1$ of the state of the system with the non-linear correction $C_1$ to build a corrected estimation:

$$\hat{X}_1^+ = C_1 * X_1$$

Where the symbol * is the binary operation defined above. The gain matrix $K_1$ is chosen so as to stabilize the non-linear estimation error e defined by:

$$e = \hat{X}_1 * X^{-1}$$

Where the symbol.$^{-1}$ is the usual inversion associated with the operation *:

$$(R_p, x_p, R_{sp}, x_{sp})^{-1} = (R_p^T, -R_p^T x_p, R_{sp}^T, -R_{sp}^T s_{sp})$$

The error can also be explicitly written in the following manner:

$$e = (\hat{R}_p R_p^T, \hat{x}_p - \hat{R}_p R_p^T x_p, \hat{R}_p R_p^T, x_p - \hat{R}_p R_p^T x_p)$$

This error is used to build the linearized system according to the usual procedure of the invariant filtering, from which the matrix $K_1$ is deduced, for example by integrating a Riccati equation.

In a propagation step 112, known per se to those skilled in the art, the processing unit 10 generates a propagated navigation state, from the state $X_1^+$. To do so, the processing unit 10 applies the evolution model which can be, for example, an odometry, an a priori model or a conventional integration of inertial measurements acquired by the proprioceptive sensors 6, 16 included in the vehicles 1, 2.

The steps described above form an iteration of the invariant Kalman filter.

Thanks to the invariant Kalman filter, a property that would also be obtained in a linear case, is obtained: the evolution of the estimation error is autonomous (it depends neither on X nor on $\hat{X}_1$).

The processing unit 10 repeats these same steps 102, 104, 106, 108, 110, 112 in new iterations of the invariant Kalman filter. The state estimated during the propagation step 112 of a given iteration is used as input data for the innovation calculation 104 and non-linear update 110 steps of a next iteration.

Ultimately, thanks to the method 100, the main vehicle 1 can obtain assistance not only on its own navigation, but also on the navigation of the secondary vehicle 2, based on the different data measured by the first sensor 3 and the proprioceptive sensors 6, 16.

A method 200 for assisting the navigation of the fleet according to a second embodiment, and implementing an invariant Kalman filter also configured as indicated above, is also shown in the right part of FIG. 3; this method 200 comprises the following steps.

In an acquisition step 202, movement data $Y_2$ from the main vehicle 1 in at least one frame attached to an object external to the main vehicle are acquired. The data $Y_2$ can comprise:

kinematic data from the main vehicle 1 in the secondary frame acquired by the second sensor 12, for example position data of the main vehicle 1 in the secondary frame (in which case the corresponding external object is the secondary vehicle)

data acquired by the receiver 8 (the corresponding object can then be considered to be the Earth, since these data allow geolocating the main vehicle relative to the Earth).

The data $Y_2$ are transmitted to the main vehicle 1, where appropriate via the communication interfaces 14 and 4 when they come from the secondary vehicle 2. The data $Y_2$ are transmitted to the processing unit 10.

In a step 204 similar to step 104, the processing unit 10 calculates the difference (innovation $Z_2$) between the observed measurements $Y_2$ and expected measurements. The expected measurements are deduced from a state previously estimated by the invariant Kalman filter, denoted $X_2$.

In a correction step 206, the processing unit 10 multiplies the innovation $Z_2$ by a gain matrix $K_2$ which expresses $Z_2$ in a linear correction $dx_2 = K_2 Z_2$ to be applied to the state of the system.

This correction step 206 is similar to step 106, with the difference that the gain matrix $K_2$ is chosen so as to stabilize a second non-linear error variable e defined by:

$$e = X^{-1} * \hat{X}_2$$

In a retraction step 208 identical to step 108, the processing unit 10 transforms the linear correction $dx_2$ into a non-linear correction $C_2$ of the same nature as $X_2$ (the state $X_2$ is not a vector because it contains rotations).

A non-linear update step 210 similar to step 110 is then implemented by the processing unit 10. In this step 210, the processing unit 10 combines the estimation $X_2$ of the state of the system with the non-linear correction $C_2$ to build a corrected estimation in the following manner:

$$\hat{X}_2^+ = \hat{X}_2 * C_2$$

In a propagation step 212 identical to step 112, the processing unit 10 generates a propagated state from the state $\hat{X}_2^+$.

The steps described above form an iteration of the invariant Kalman filter.

The processing unit 10 repeats these same steps 202, 204, 206, 208, 210, 212 in new iterations of the invariant Kalman filter. The state estimated during the propagation step 212 of a given iteration is used as input data for the innovation calculation 204 and non-linear update 210 steps of a next iteration.

As in the method 100 according to the first embodiment, the dependence of the evolution of the error relative to the state of the system is reduced.

Either of the methods 100, 200 described above can be implemented by the main vehicle 1.

The fundamental difference between the method 100 according to the first embodiment and the method 200 according to the second embodiment lies in the relative kinematic data between the main vehicle 1 and the secondary vehicle 2 used as an observation by the invariant Kalman filter: in the case of the method 100, these data are expressed in the frame attached to the main vehicle 1, while in the case of the method 200, these data are expressed in an external frame.

The processing unit 10 of the main vehicle 1 advantageously implements a method according to a third embodiment, combining an implementation in parallel of the two preceding methods 100 and 200.

The first method 100 leading to obtaining the data $\hat{X}_1^+$ is for example implemented by a first processor of the processing unit 10, while the second method 200 leading to obtaining the data $\hat{X}_2^+$ is implemented by a second processor of the processing unit. In other words, two invariant Kalman filters are implemented in parallel by these two processors.

In a merging step 302, the processing unit 10 merges the data $\hat{X}_1^+$ and $\hat{X}_2^+$ in order to obtain an optimized estimation of the navigation state of the fleet, denoted $\hat{X}_{opt}^+$. For example, $\hat{X}_{opt}^+$ is the average of $\hat{X}_2^+$ and $\hat{X}_2^+$. As the states $\hat{X}_1^+$ and $\hat{X}_2^+$ are not vectors, their classic average is replaced with any average definition adapted to manifolds. Those skilled in the art may find generalized average definitions for manifolds in the document Markley, F. L., Cheng, Y., Crassidis, J. L., & Oshman, Y. (2007). Averaging quaternions. Journal of Guidance, Control, and Dynamics, 30(4), 1193-1197.

Where appropriate, this average is weighted by covariance matrices associated with the data $\hat{X}_1^+$ and $\hat{X}_2^+$ expressing the uncertainty of these estimations. These covariance matrices are also produced by the two invariant Kalman filters of the methods 100 and 200.

The invention is not limited to the embodiments described above.

It is possible to include in the navigation state of the fleet velocities or the vectors representing the characteristic point positions $q_i$ (or daymarks). This navigation state may be limited to comprising position and rotation data.

Furthermore, the considered fleet of vehicles can comprise several secondary vehicles, and the navigation state can be extended so as to comprise elements specific to each of the secondary vehicles of the fleet.

In addition, it is not mandatory to use inertial data acquired by an inertial unit during the implementation of either of the methods described above. However, when such inertial data are used, the state of the system should include states representative of the velocity of each vehicle equipped with an inertial unit. It will be:
the velocity $v_p$ of the main vehicle in the reference frame,
the velocity deviation $v_{sp}$, relative to the fixed frame, between the two vehicles, projected in the frame attached to the secondary vehicle. To put it another way, $v_{sp}$ is defined by $$v_{sp}=R_s^T(v_p-v_s)$$

where $v_p$ is the velocity of the main carrier in the fixed frame, $v_s$ the velocity of the secondary carrier in the fixed frame and $R_s=R_pR_{sp}^T$ the rotation matrix allowing the switching of the coordinates of a point in the secondary frame to its coordinates in the fixed frame. Only one of these two states can also be added to the system.

It should be noted that the navigation state could, in another embodiment, be formed by the natural variables ($R_p$, $x_p$, $R_s$, $x_s$), where the rotation matrix $R_S$ and the vector $x_s \in \mathbb{R}^3$ are such that a point with coordinates $u \in \mathbb{R}^3$ in the frame attached to the secondary vehicle will have the coordinates $R_s u + x_s$ in the fixed frame. In this case, the binary operation to be used is more complex:

$$(R_p, x_p, R_s, x_s)*(R'_p, x'_p, R'_s, x'_s) = \begin{pmatrix} R_p R'_p \\ x_p + R_p x'_p \\ R_p R'_s R_p^T R_s \\ R_p R'_s R_p^T (x_s - x_p) + R_p x'_s + x_p \end{pmatrix}$$

The invention claimed is:

1. A method for assisting the navigation of a fleet of vehicles comprising a main vehicle and a secondary vehicle movable relative to the main vehicle, the method comprising:
receiving data acquired by at least one sensor, the received data comprising relative kinematic data between the main vehicle and the secondary vehicle,
estimating a navigation state of the fleet of vehicles by an invariant Kalman filter using the received data as observations, wherein the navigation state comprises:
first variables representative of a first rigid transformation linking a frame attached to the main vehicle to a reference frame, and
second variables representative of a second rigid transformation linking theft frame attached to the main vehicle to a frame attached to the secondary vehicle,
wherein the invariant Kalman filter uses as binary operation an operation comprising a term-by-term composition of the first rigid transformation and of the second rigid transformation.

2. The method of claim 1, wherein the navigation state of the fleet further comprises at least one error state of the at least one sensor, and wherein the binary operation is additive for the at least one error state of to the at least one sensor.

3. The method of claim 1, further comprising receiving proprioceptive movement data from the main vehicle and from the secondary vehicle, and wherein the estimating comprises phases of:
propagating a navigation state of the fleet previously estimated by the invariant Kalman filter using the proprioceptive movement data from the main vehicle and the secondary vehicle to obtain a propagated state,
updating the propagated state using the observations to obtain a new navigation state of the fleet.

4. The method of claim 1, wherein the proprioceptive movement data are acquired by respective proprioceptive sensors of the main vehicle and of the secondary vehicle, and the navigation state of the fleet further comprises at least one error state of at least one of the proprioceptive sensors for which the binary operation is additive.

5. The method of claim 1, wherein:
the first variables comprise a rotation matrix representing an attitude of the main vehicle and a position vector of the main vehicle, and
the second variables comprise a rotation matrix representing the attitude of the main vehicle relative to the secondary vehicle and a position vector of the main vehicle relative to the secondary vehicle.

6. The method of claim 1, wherein:
the navigation state of the fleet further comprises a velocity vector v p of the main vehicle in the reference frame, and a velocity vector equal to $R_S^T(v_p-v_s)$, wherein $v_s$ is a velocity of the secondary vehicle in the reference frame, and $R_S$ is a rotation matrix representing the attitude of the secondary vehicle relative to the reference frame,
the binary operation applies a transformation to one of the position vectors and applies the same transformation to one of the velocity vectors.

7. The method of claim 1, wherein estimating the navigation state of the fleet of vehicles is carried out by the main vehicle, and the received data comprise position data of the secondary vehicle in the frame attached to the main vehicle acquired by at least one first sensor of the main vehicle.

8. The method of claim 7, wherein the at least one first sensor of the main vehicle comprises a lidar or a camera.

9. The method of claim 1, wherein estimating the navigation state of the fleet of vehicles is carried out by the main vehicle, and the received data comprise position data of the main vehicle in the frame attached to the secondary vehicle acquired by at least one second sensor of the secondary vehicle.

10. The method of claim 9, wherein the at least one second sensor of the secondary vehicle comprises a lidar or a camera.

11. The method of claim 1, wherein the received data comprise relative kinematic data between the main vehicle and a third object separate from the main vehicle and from the secondary vehicle, the relative kinematic data between the main vehicle and the third object also being used as observations by the invariant Kalman filter.

12. The method of claim 11, wherein the third object is a daymark.

13. The method of claim 11, wherein the relative kinematic data between the main vehicle and a third object comprise data acquired by a GPS/GNSS receiver of the main vehicle.

14. The method of claim 1, further comprising:
carrying out the estimating step based on position data of the secondary vehicle in the frame attached to the main vehicle so as to generate a first estimation of the navigation state of the fleet,
carrying out the estimating step based on position data of the main vehicle in the frame attached to the secondary vehicle, so as to generate a second estimation of the navigation state of the fleet,
merging the first and second estimations of the navigation state of the fleet so as to produce a third estimation of the navigation state of the fleet.

15. The method of claim 14, wherein the merging comprises computing an average of the first estimation of the navigation state of the fleet and of the second estimation of the navigation state of the fleet.

16. The method according to claim 1, wherein the received data used as observations form a vector $Y_1=l(X_1, y_0)$, wherein $l(.,.)$ is a left group action for the binary operation, $X_1$ is the navigation state of the fleet, and $y_0$ is a vector of the same dimension as $Y_1$, and wherein the invariant Kalman filter uses an innovation $Z=l(\hat{X}_1^{-1}, Y_1)$.

17. The method according to claim 1, wherein the received data used as observations form a vector $Y_2=l(\hat{X}_2^{-1}, y_0))$ wherein $l(.,.)$ is a left group action for the binary operation, $X_2$ is the navigation state of the fleet, and $y_0$ is a vector of the same dimension as $Y_2$, and wherein the invariant Kalman filter uses an innovation $Z=l(\hat{X}_2, Y_2)$.

18. A device for assisting the navigation of a fleet of vehicles comprising a main vehicle and a secondary vehicle movable relative to the main vehicle, the device comprising:
a receiving interface to receive data acquired by at least one sensor, the data comprising relative kinematic data between the main vehicle and the secondary vehicle,
a processing unit configured to implement an invariant Kalman filter so as to estimate a navigation state of the fleet of vehicles, wherein the invariant Kalman filter is configured to use the received data as observations, wherein the navigation state comprises: first variables representative of a first rigid transformation linking a frame attached to the main vehicle to a reference frame, and second variables representative of a second rigid transformation linking the frame attached to the main vehicle to a frame attached to the secondary vehicle, and wherein the invariant Kalman filter is configured to use as binary operation a term-by-term composition of the first rigid transformation and of the second rigid transformation.

19. The method of claim 14, wherein the merging comprises calculating an average of the first and second estimations of the navigation state of the fleet.

20. A device for assisting the navigation of a fleet of vehicles comprising a main vehicle and a secondary vehicle movable relative to the main vehicle, the device comprising:
at least one first sensor onboard the main vehicle, wherein the at least one first sensor is configured to acquire data of the secondary vehicle, the data comprising relative kinematic data between the main vehicle and the secondary vehicle,
at least one processor configured to implement an invariant Kalman filter to estimate a navigation state of the fleet of vehicles, wherein the invariant Kalman filter is configured to use the received data as observations, wherein the navigation state comprises:
first variables representative of a first rigid transformation linking a frame attached to the main vehicle to a reference frame, and
second variables representative of a second rigid transformation linking the frame attached to the main vehicle to a frame attached to the secondary vehicle, and
wherein the invariant Kalman filter is configured to use as a binary operation a term-by-term composition of the first rigid transformation and of the second rigid transformation.

* * * * *